United States Patent [19]

Orne

[11] 3,815,053

[45] June 4, 1974

[54] STABLE SIGNAL GENERATOR

[76] Inventor: Laurence E. Orne, 4 Eubar Cir., Billerica, Mass. 01821

[22] Filed: Jan. 16, 1973

[21] Appl. No.: 324,018

[52] U.S. Cl. .................................. 331/168, 331/159

[51] Int. Cl. .............................................. H03b 5/10

[58] Field of Search ............................ 331/159, 168

[56] References Cited

UNITED STATES PATENTS 2,231,854 2/1941 Percival ............................ 331/168

*Primary Examiner*—John Kominski
*Attorney, Agent, or Firm*—Harry A. Herbert, Jr.; George Fine

[57] ABSTRACT

A stable signal generator providing a signal of preselected frequency regardless of variation of the output impedance. The signal generator includes a tuned network associated with a first balanced amplifier. A second balanced amplifier receives the output signal from the first balanced amplifier and provides a stable frequency output signal. The first balanced amplifier is cathode coupled to the tuned frequency network with positive feedback from one of the outputs of the first balanced amplifiers to provide the requisite phase and amplitude signal for oscillation purposes.

2 Claims, 1 Drawing Figure

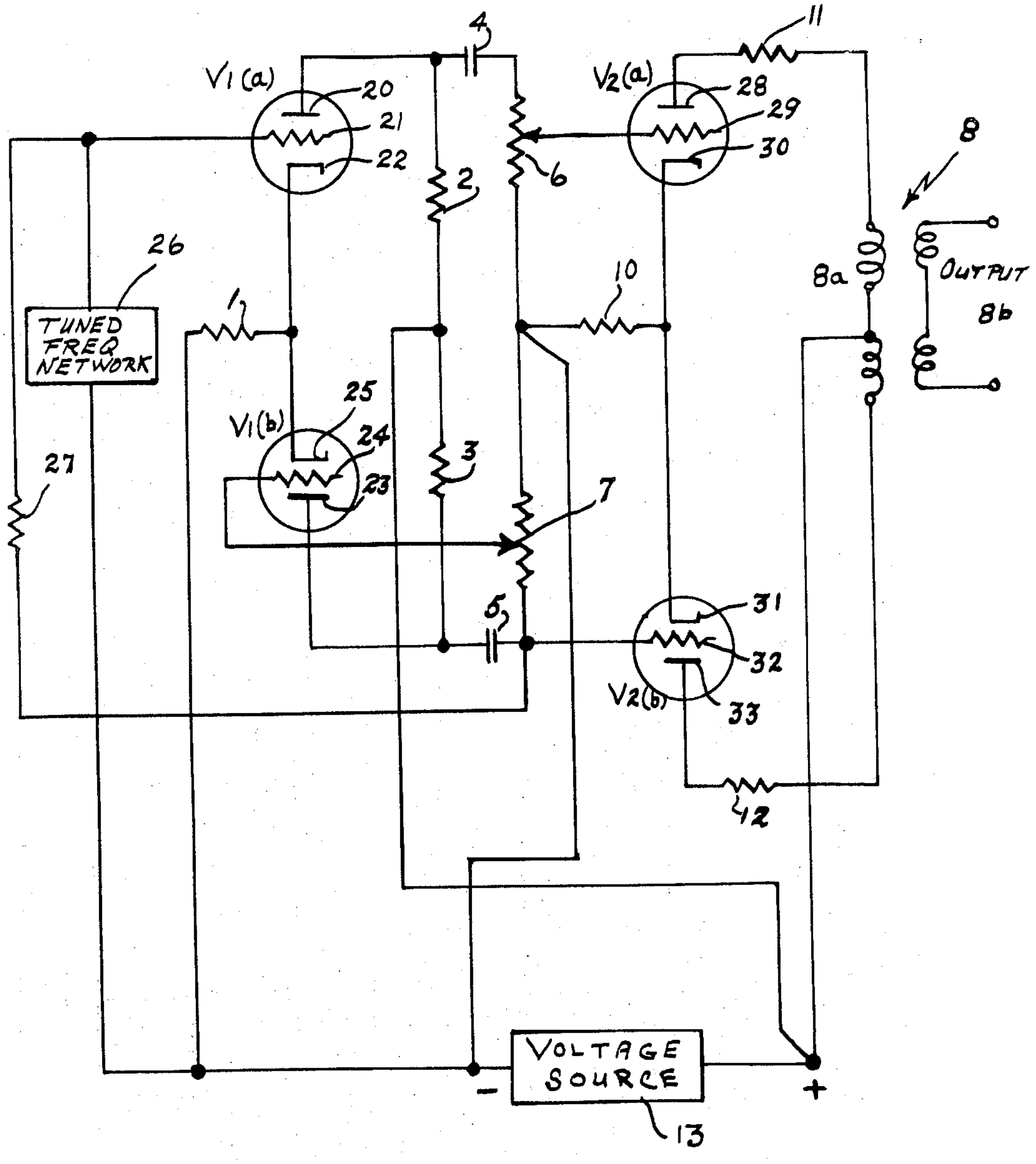
4
11
V1 (a)
20
21
22
V2 (a)
28
29
30
8
2
6
26
8a
OUTPUT
8b
10
1
TUNED FREQ NETWORK
25
V1 (b)
24
23
3
27
7
31
5
32
V2 (b)
33
12
VOLTAGE SOURCE
−
+
13

STABLE SIGNAL GENERATOR

BACKGROUND OF THE INVENTION

In the prior art there exists signal generators to provide a preselected frequency signal for reference or test purposes. However, in many instances the load impedance varies which results in a concurrent variation of the frequency. The present signal generator is stable in spite of the variation of the load impedance and may be utilized as a reference frequency generator for testing airborne switching and multiplex equipment at selected frequencies.

SUMMARY OF THE INVENTION

A signal generator is provided which remains frequency stable regardless of variations of load impedance. First and second balanced amplifiers are utilized, each amplifier having first and second sections with the cathodes thereof being interconnected and the interconnected cathodes being connected by way of a preselected cathode resistor to the negative side of a voltage source to provide negative current feedback. A tuned circuit of predetermined frequency is connected between the grid of the first section of the first balanced amplifier and the aforementioned negative side of the voltage source. Positive feedback of the requisite phase and amplitude is provided from the output of the second section of the first balanced amplifier by way of a resistor to the grid of said first section of the first balanced amplifier for oscillation purposes. It is emphasized that the second section of the first balanced amplifier also acts as a current regulator to obtain an unvarying fixed voltage across its associated cathode resistor. Each of the first and second sections of the second balanced amplifier receives an input signal from its associated section of the first balanced amplifier to achieve push-pull input operation. The outputs from the first and second sections are also push-pull and are fed to a center tapped output transformer. The negative current feedback of the first second balanced amplifiers and the current regulation in the second section of the first balanced amplifier result in stable frequency operation in spite of variations in the output load impedance.

DESCRIPTION OF THE DRAWING

The single FIGURE of the preferred embodiment shows a stable signal generator partly in black and partly in schematic form.

DETAILED DESCRIPTION OF THE PREFERRED EMBODIMENT

Now referring to the single figure, there is shown a first balanced amplifier being comprised of two amplifier sections. The first section includes electron vacuum tube V1(a) and the second, V1(b). Electron vacuum tube V1(a) is composed of plate electrode 20, grid electrode 21, and cathode electrode 22. Tube V1(b) includes plate electrode 23, grid electrode 24, and cathode electrode 25. Cathode electrodes 22 and 25 are connected together, with cathode resistor 1 connected between the negative terminal of voltage source 13 and cathode electrodes 22 and 25. The two amplifier sections provide a balanced output but have essentially a common input signal in that a signal provided by tuned frequency network 26 is received by grid electrode 21 of tube V1(a) and this signal is then received by cathode electrode 25 of tube V1(a), tube V1(b) by way of the signal developing across resistor 1. Tuned network 26 is conventional and may be any frequency selective resonant circuit that provides the proper phase angle of signal to be delivered to tube V1(a). The impedance isolation of tuned network is accomplished because of direct signal coupling between tubes V1(a) and V1(b) by way of their interconnected cathodes. It is noted that tuned frequency network is variable and may be tuned to the desired specific frequency. Resistors 2 and 3 provide balanced plate potentials to tubes V1(a) and V1(b). Capacitors 4 and 5 are utilized as output coupling capacitors for tubes V1(a) and V1(b), respectively. Positive feedback to excite tuned resonant circuit 26 is obtained by connecting preselected resistor 27 between central grid electrode 21 of tube V1(a) and the output side of capacitor 5.

The second balanced amplifier is also comprised of two amplifier sections. The first section includes electron vacuum tubes V2(a) and the second V2(b). Electron vacuum tube V2(a) is comprised of plate electrode 28, grid electrode 29, and cathode electrode 30. Tube V2(a) includes cathode electrode 31, grid electrode 32, and plate electrode 33. Cathode electrodes 30 and 31 are interconnected and then are connected to the negative terminal of voltage source 13 by way of cathode resistor 10. Potentiometer 6 is connected from the output side of capacitor 4 to the negative side of voltage source 13. The center variable top thereof is connected to grid electrode 29 of tube V2(a). Potentiometer 7 is connected between the output side of capacitor 5 and the negative side of voltage source 13. The center tap thereof is connected to gride electrode 24 of tube V1(b). Output transformer 9 has center tapped primary **9*a* and secondary 9*b* which provides the output signal of the desired stable frequency. One side of primary 9*a* is connected to plate electrode 28 by way of resistor 11 and the other side to plate electrode 33 by way of resistor 12. The center tap of primary 9a is connected to the positive terminal of voltage source 13. Balanced push-pull signals are obtained from the outputs of tubes V2(a) and V2(b) by adjustment of potentiometers 6 and 7,** respectively.

It is noted that electron vacuum tube V1(b) operates as a voltage regulated amplifier. The reference frequency signal is obtained across resistor 1 while adjustment of potentiometer 7 limits the applied signal voltage to the grid circuit. Cathode bias voltage for tubes V1(a) and V1(b) is determined by the balance of DC current and signal voltages amplified at the specific desired frequency of tuned network 26. Electron tubes V2(a) and V2(b) outputs by way of transformer 8 sum the equal and uniform signals from tubes V1(a) and V1(b). Cathode resistor 10 provides bias to tubes V2(a) and V2(b) and also results in a degenerative operation to improve the waveform at low frequencies, for example, less than 60 Hz. Resistors 11 and 12 improve the waveform characteristics of transformer 8 at low frequencies. DC plate potentials are obtained from voltage source 13 and may be between 150 to 250 volts. Variations of plate supply voltages will not cause noticeable frequency shift of tuned network 26. The output signal from secondary **8*b*** terminated by a 600 ohm impedance is + 20 dbm with a 250 volt source. A 150 volt source provides a signal output of +16 dbm. It is emphasized a variation in the output impedance will not effect the stability of the frequency of the output signal.

The balanced amplifiers of the present invention are designed for minimum capacity loaded circuits. Direct coupling in the cathode circuits affords a uniform frequency response with a simplified tuned network. The positive feedback circuit is a coupled circuit via a proper limiting current resistor from the positive phase of the input to the first balanced amplifier at high impedance. The phase reversal voltage of the necessary phase and amplitude required for oscillation is provided by a coupling circuit having a common impedance to both of the balanced amplifiers, one being a conventional amplifier, the second, a cathode signal injection amplifier. The gain of this amplifier is limited by an adjustable voltage divider in one section of the balanced circuit, while the output of the conventional amplifier is adjusted by means of the potentiometer.

What is claimed is:

1. A stable signal generator for providing a signal of a preselected frequency regardless of variations in load impedance comprising first and second balanced amplifiers, each providing push-pull output signals of equal amplitudes, said first balanced amplifier having first and second electron vacuum tubes, said second balanced amplifier having third and fourth electron vacuum tubes, each of said electron vacuum tubes, each of said electron vacuum tubes having plate, grid, and cathode, said first and second electron vacuum tubes having associated cathodes interconnected to provide direct coupling of a signal therebetween, said third and fourth electron vacuum tubes also having associated cathodes interconnected, a voltage source having positive and negative terminals, a first preselected resistor connected between said interconnected cathodes of said first and second electron vacuum tubes and said negative terminals to provide degeneration and for development of a voltage thereacross a second preselected cathode resistor connected between said interconnected cathodes of said third and fourth electron vacuum tubes and said negative terminal also to provide degeneration, variable resonant circuit means tuned to a preselected frequency and connected between said grid of said first electron vacuum tube and said negative terminal, first and second coupling capacitors, each having first and second sides, said first coupling capacitor having the first side thereof connected to said plate of said first electron vacuum tube, said second coupling capacitor interconnecting said grids of said second and fourth electron vacuum tubes, a first potentiometer connected between said second side of said first coupling capacitor and said negative terminal, said first potentiometer having a variable center tap connected to said grid of said third electron vacuum tube, a second potentiometer connected between said grid of said fourth electron vacuum tube and said negative terminal, said second potentiometer having a variable center tap connected to said grid of said second electron vacuum tube, transformer means having a center tapped primary and a secondary, said primary connected between said plates of said third and fourth electron vacuum tubes, said center tap being connected to said positive terminal, and a feedback resistor of preselected magnitude interconnecting said grids of said first and fourth electron vacuum tubes to provide positive feedback of the correct phase and amplitude for oscillation purposes.

2. A stable signal generator as described in claim 1 further including a first limiting resistor interposed between said plate of said third electron vacuum tube and said primary and a second limiting resistor interposed between said plate of said fourth electron vacuum tube and said primary.

* * * * *